(12) United States Patent
Flick

(10) Patent No.: US 6,488,043 B2
(45) Date of Patent: Dec. 3, 2002

(54) VALVE SYSTEM

(75) Inventor: Roland E. Flick, Elma, NY (US)

(73) Assignee: Gaymar Industries, Inc., Orchard Park, NY (US)

( * ) Notice: Subject to any disclaimer, the term of this patent is extended or adjusted under 35 U.S.C. 154(b) by 6 days.

(21) Appl. No.: 09/842,432

(22) Filed: Apr. 25, 2001

(65) Prior Publication Data

US 2002/0157716 A1 Oct. 31, 2002

(51) Int. Cl.⁷ .................................................. F16L 37/30
(52) U.S. Cl. ........................................... 137/1; 137/614
(58) Field of Search ......................... 137/614, 1–614.06

(56) References Cited

U.S. PATENT DOCUMENTS

| | | |
|---|---|---|
| 2,748,797 A | 6/1956 | Heizer et al. |
| 3,659,625 A | 5/1972 | Coiner et al. |
| 4,986,738 A | 1/1991 | Kawasaki et al. |
| 5,937,885 A * | 8/1999 | Sampson ................ 137/614 X |
| 5,944,066 A | 8/1999 | Viard |
| 6,152,169 A | 11/2000 | Flick |
| 6,176,263 B1 * | 1/2001 | Lacroix et al. ............. 137/614 |

\* cited by examiner

*Primary Examiner*—Kevin Lee
(74) *Attorney, Agent, or Firm*—Nixon Peabody LLP

(57) ABSTRACT

The present invention is directed to a fluid fitting coupling system. This system has first and second fluid assemblies, and first and second rotationally engagable axial retainers. The first and second fluid assemblies each have a fluid fitting body, a central axis, a fluid passageway, a mating component for rotation, and a movable sealing apparatus. While the first and second rotationally engagable axial retainers each have an opening for a fluid to traverse there through. The fluid fitting coupling system operates when the second rotationally engagable axial retainer engages and rotates, in a first direction, the first rotationally engagable axial retainer. In response, the first and second mating components rotate the respective first and second fluid fitting in a direction opposite the first direction so the movable sealing apparatuses are spaced a distance from the respective openings.

15 Claims, 4 Drawing Sheets

VALVE SYSTEM

FIELD OF THE INVENTION

This invention relates generally to fluid fittings. Specifically, it involves the field of molded coupling systems for quickly connecting and disconnecting fittings which handle fluids.

BACKGROUND OF THE INVENTION

The couplings generally consist of a male member and a female member with sealed fluid passageways connecting therebetween. The female member generally is a cylindrical body with a relatively large diameter longitudinal bore at one end and a relatively small diameter longitudinal bore at the other end. The small bore facilitates connections to hydraulic or fluid lines, while the large bore seals and slidingly engages the male member of the coupling.

The male member includes a cylindrical body having an outer diameter approximately equal to the diameter of the large female bore, and a connection at its other end for hydraulic lines. When the cylindrical body of the male member is inserted into the large bore of the female member then fluid flow is established between the male member and the female member. In some embodiments, it is preferable to connect the male member to the female member by sliding it into the large bore of the female member, without rotation or other manipulation of one or both coupling members.

The male member or female member may be connected to a junction plate of a manifold. The male or female member may be attached to the junction or manifold plate using various means such as set screws or threads. In some cases, the male member is attached to one junction or manifold plate, while the female member is attached to an opposing plate so as to face the male member and align with it.

The fluid fitting coupler is one which has existed for years. As more economical products have been sought the desire to adapt designs for injection molding has increased. In the majority of instances this adaptation has occurred by merely molding existing designs. In only limited instances have those products sought to create completely new designs which are especially adapted to a molding environment, that is, where a cavity shape is imparted to some type of material. One of the fields within this general area which has been particularly challenging to adapt for economical manufacture is that of fluid fitting quick disconnects. Often due to this field's sometimes unusual material requirements, it has been perceived as requiring a hybrid approach. Through this approach, while some components have been molded, others have been machined or the like. Thus, rather than being optimized for economical manufacture such as is available in the injection molding environment, designers often have accepted limitations in either operation or manufacture.

Naturally, the problems designers have faced are greatly varied based in part upon the application involved. In some applications, the physical size of the quick disconnect designs have been a challenge. In other applications, reliability and the actual operation of coupling the two assemblies together has been the challenge. Other problems have ranged from challenges in achieving adequate locking of the coupling to problems in creating shut-off valve subassemblies. Irrespective of the specific operational problems deemed paramount, it has been almost universally true that existing designs have not been able to be manufactured as economically as desired. In spite of a demand for high reliability and ease of use, consumers have been reluctant to incorporate components which cost many times the amount of a typical fitting.

As is often true for fluid fittings in general, many aspects of the invention utilize elements which have long been available. In spite of this fact, and in spite of the fact that those skilled in the art of molded fluid fitting couplings had long desired such a design, the invention applies these elements in a fashion which achieves long felt needs very economically.

Sampson, in U.S. Pat. No. 5,937,885, discloses a quick disconnect fluid fitting coupling system which can not only be completely molded but which also can consist of as little as two parts. In one embodiment, the design involves male and female assemblies which are held axially by a flange and which lock in place through a radially resilient detent at the flange's outer abutment. Another embodiment includes a molded annular spring which locks the two assemblies together. A number of other features such as swivels and shut-off valves are also disclosed.

The Sampson devices, however, require components that are difficult to manufacture and require components, like springs, that are extremely breakable and/or deformable.

SUMMARY OF THE INVENTION

The present invention solves those problems and many more. The present invention is directed to a fluid fitting coupling system. This system has first and second fluid assemblies, and first and second rotationally engagable axial retainers. The first and second fluid assemblies each have a fluid fitting body, a central axis, a fluid passageway, a mating component for rotation, and a movable sealing apparatus. While the first and second rotationally engagable axial retainers each have an opening for a fluid to traverse there through. The fluid fitting coupling system operates when the second rotationally engagable axial retainer engages and rotates, in a first direction, the first rotationally engagable axial retainer. In response to the insertion and rotation of the retainers, the first and second mating components rotate the respective first and second fluid fitting in a direction opposite the first direction so the movable sealing apparatuses are spaced a distance from the respective openings for fluid to flow within the system.

DETAILED DESCRIPTION OF THE PRESENT INVENTION

Figure 1:
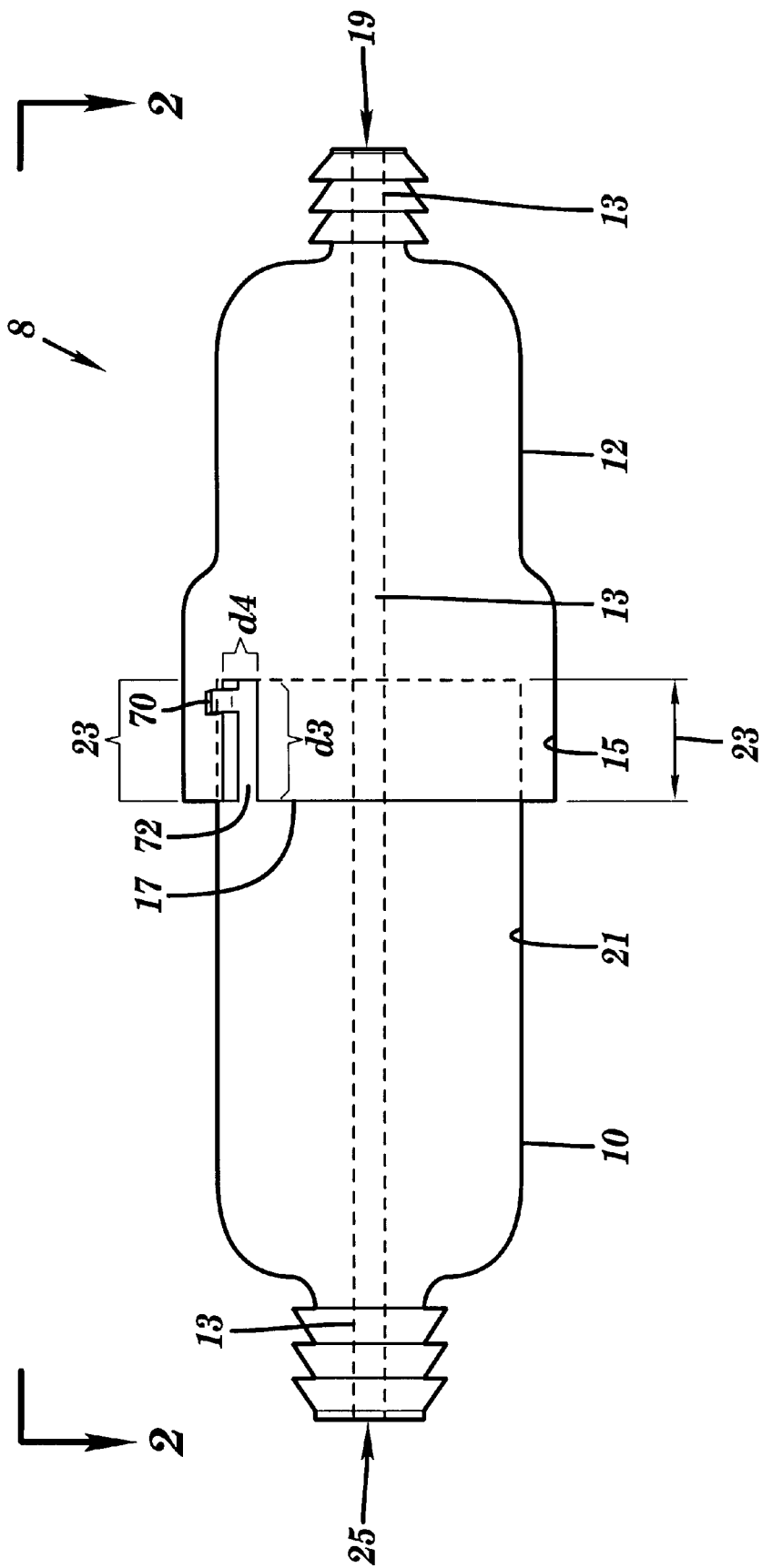
FIG. 1 illustrates an embodiment of the present invention.

As shown in FIG. 1, the couplings 8 consist of a male member 10 and a female member 12 with sealed fluid passageways 13 connecting therebetween. The female member 12 generally is a cylindrical body 15 with a relatively large diameter longitudinal bore 17 at one end and a relatively small diameter longitudinal bore 19 at the other end. The first small bore 19 facilitates connections to hydraulic or fluid lines, while the large bore 17 seals and slidingly engages the male member 10 of the coupling 9.

The male member 10 includes a cylindrical body 21 having a male insert section 23 having an outer diameter approximately equal to the diameter of the large female bore 17, and a second small bore 25 at its other end for hydraulic or fluid lines. When the male insert section 23 is inserted and rotated, a predetermined distance, into the large bore 17 of the female member 12 fluid flow is established between the male member 10 and the female member 12.

The male member 10 has at least one protrusion 70 on the male insert section 23 that corresponds with a protrusion guide 72 at and near the large bore 17 of the female member 12. The protrusion guide 72 has a particular shape that forces the male member 10 to go a predetermined distance into the female member 12 and rotate a predetermined distance and direction within the female member 12 to allow the fluid to flow within the male member 10 and the female member 12. The shape of the protrusion guide 72 can be any shape, but in particular, the protrusion guide 72 is shaped like the letters "L" or "J".

Figure 2:
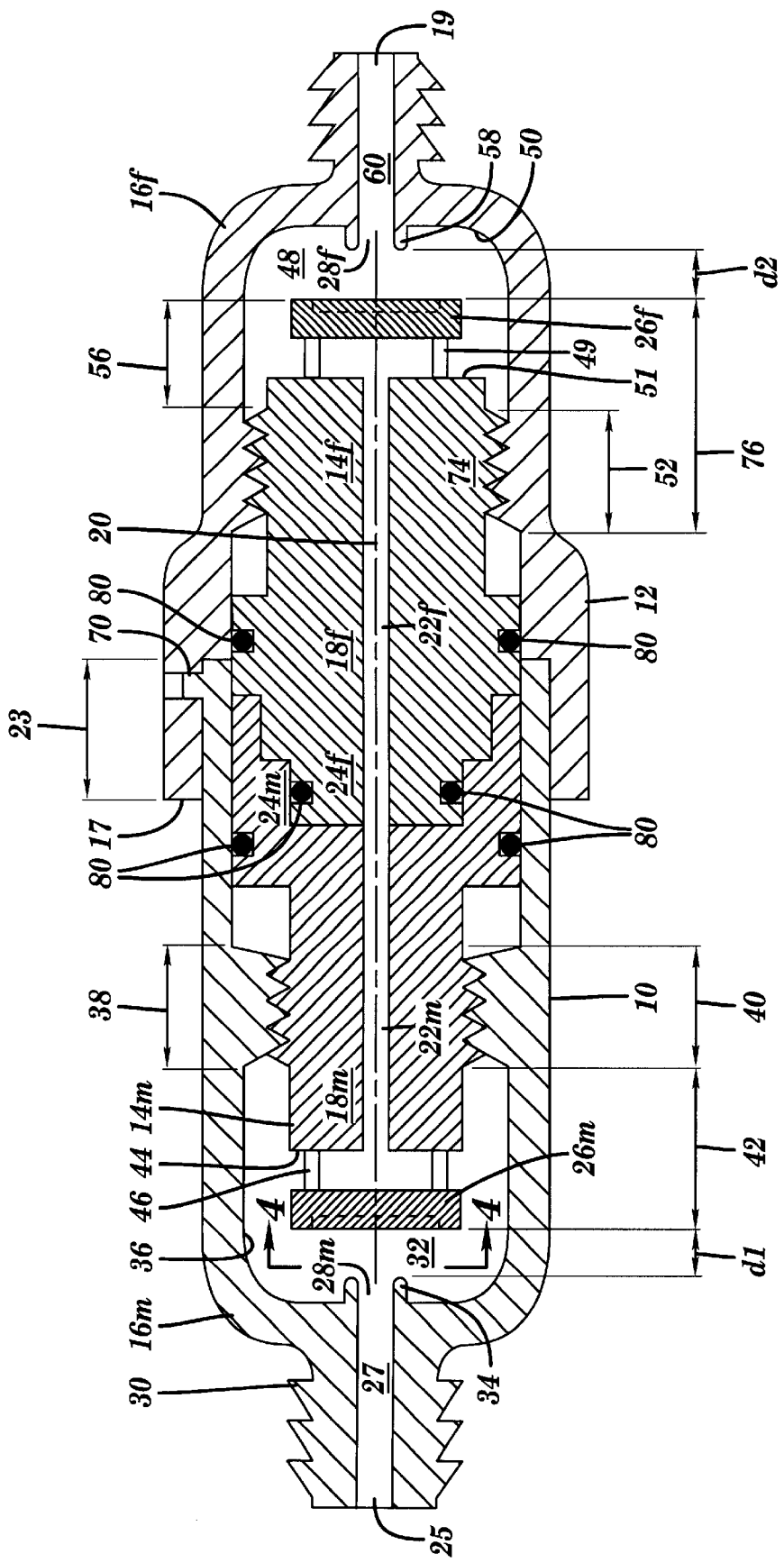
FIG. 2 illustrates a cross-sectional view of FIG. 1 taken along the line 2—2.

FIG. 2 is cross section view of FIG. 1 taken along the line 2—2 and shows the male member 10 and the female member 12 according to a first embodiment of the present invention, in the open position for the fluid to pass therethrough. The male and female members 10, 12 are each divided into two components, a fluid fitting assembly 14m, 14f and a rotationally engagable axial retainer 16m, 16f, which are described above. For sake of convenience, Applicant describes the present invention in such a way that the fluid goes from the male member 10 to the female member 12. Obviously, the fluid can flow in the other direction.

Each fluid fitting assembly 14m, 14f has a fluid fitting body 18m, 18f, a central axis 20, a fluid passageway 22m, 22f, a mating section for rotation 24m, 24f, and a sealing apparatus 26m, 26f. Each assembly 14m, 14f can also be made of any conventional material such as plastic or metal.

Figure 6:
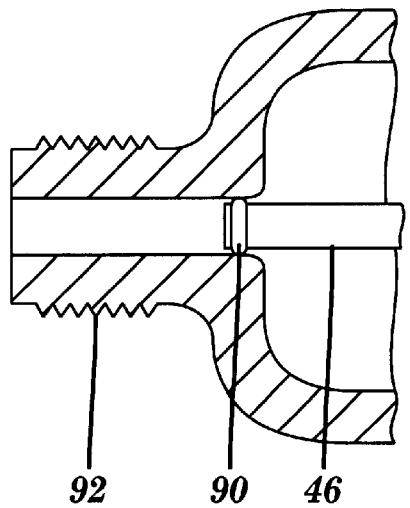
FIG. 6 illustrates an alternative embodiment of the sealing apparatus.

Each rotationally engagable axial retainer 16m, 16f has an opening 28m, 28f for a fluid, not shown, to traverse there through, and to which the fluid fitting is responsive thereto. The rotationally engagable axial retainers 16m, 16f are made of any conventional material such as metal or plastic. The retainer 16m has an adapter 30 that connects to a fluid conduit, not shown, by conventional methods. For example, applicant shows a ribbed adaptor 30 notwithstanding the illustrations, the adaptor 30 can be any conventional conduit connecting unit, like a pipe thread or hose thread 92, as shown in FIG. 6. Returning to FIG. 2, the adaptor 30 has a second small bore 25 on the exterior surface, and the fluid enters the second bore 25, from the fluid conduit, into a first fluid path 27 that leads to the opening 28.

In the embodiment illustrated in FIG. 2, the opening 28 directs a fluid, from the fluid conduit, into a first chamber 32. Extending into the first chamber 32 and surrounding the opening 28 is a protrusion 34. Since FIG. 2 illustrates the system 8 in an open position, there is a distance (d1) between the protrusion 34 and the sealing apparatus 26m. The distance d1 allows the fluid to enter and circulate within the first chamber 32, which is defined by (1) a threaded interior section 38 of the rotationally engagable axial retainer 16m, (2) the interior walls 36 on the lower section of the rotationally engagable axial retainer 16m below the threaded interior section 38, (3) a threaded exterior section 40 of the fluid fitting assembly 14m that mates with the threaded interior section 38, and (4) the lower section 42 (below the threaded section 40) of the fluid fitting assembly 14m.

The lower section 42 of the fluid fitting assembly 14m has the sealing apparatus 26m that extends from a base section 44 of the fluid fitting assembly 14m, by a plurality of extensions 46. By having a plurality of extensions 46, the fluid can flow through to the fluid passageway 22m that is located along the central axis 20 of the fluid fitting assembly 14m.

The fluid passageway 22m directs the fluid to the corresponding fluid passageway 22f. The fluid passageway 22f is also located on the central axis 20 of the fluid fitting assembly 14f. From the fluid passageway 22f, the fluid enters a second chamber 48 through a plurality of extensions 49 that separate the sealing apparatus 26f from a base section 51 of the fluid fitting assembly 14f, positioned below a threaded area 74 on the exterior of a lower section 76 of the fluid fitting assembly 14f.

The second chamber 48 is within retainer 16f and is like the first chamber 32, except it is defined by (1) a threaded interior section 52 of the rotationally engagable axial retainer 16f, (2) the interior walls 50 on the lower section of the rotationally engagable axial retainer 16f below the threaded interior section 52 that engages with the threaded area 74, (3) the threaded exterior section 74 of the fluid fitting assembly 14f, and (4) the lower section 56 (below the threaded section 54) of the fluid fitting assembly 14f. Extending into the second chamber is a second protrusion 58 that surrounds the opening 28f, which is spaced a distance (d2) from the sealing apparatus 26f for it is in the open position.

From opening 28f, the fluid passes through a second fluid path 60 and the small bore 19 to a second conduit, not shown.

Turning to how the couplers 10, 12 are connected, we turn to FIGS. 1 and 2. When the protrusion 70 is inserted into a protrusion guide 72, the male member 10 is inserted into the female member 12 a predetermined distance (d3) and then rotated a predetermined direction and distance (d4).

When the protrusion 70 inserts into the guide 72 the distance (d3), the female mating section 24m of the fluid fitting assembly 14m receives and engages the male mating section 24f of the fluid fitting assembly 14f. And when the protrusion rotates within the guide 72 the distance (d4) in a first direction, then the female mating section 24m rotates the male mating section 24f an equal distance to d4 except it is in a second direction, opposite the first direction. When the fluid fitting members 14m, 14f are rotated, the fluid fitting members 14m, 14f come together. Thereby, the sealing apparatuses 26m, 26f are moved a distance d1 and d2 from the protrusions 34, 58, and the male and female mating sections 24m, 24f are simultaneously moved closer to each other so the fluid passageways 22m, 22f essentially become a single unit. Moreover, fluid fitting assemblies 14f, 14m are secured in position by the respective threaded sections 40, 38, 52, 74.

To maintain a fluid seal between the retainers 16m, 16f and the fluid fitting assemblies 14m, 14f there are a plurality of o-rings or equivalent conventional sealing tools 80 used throughout the system 8 to limit any fluid leakage.

Figure 3:
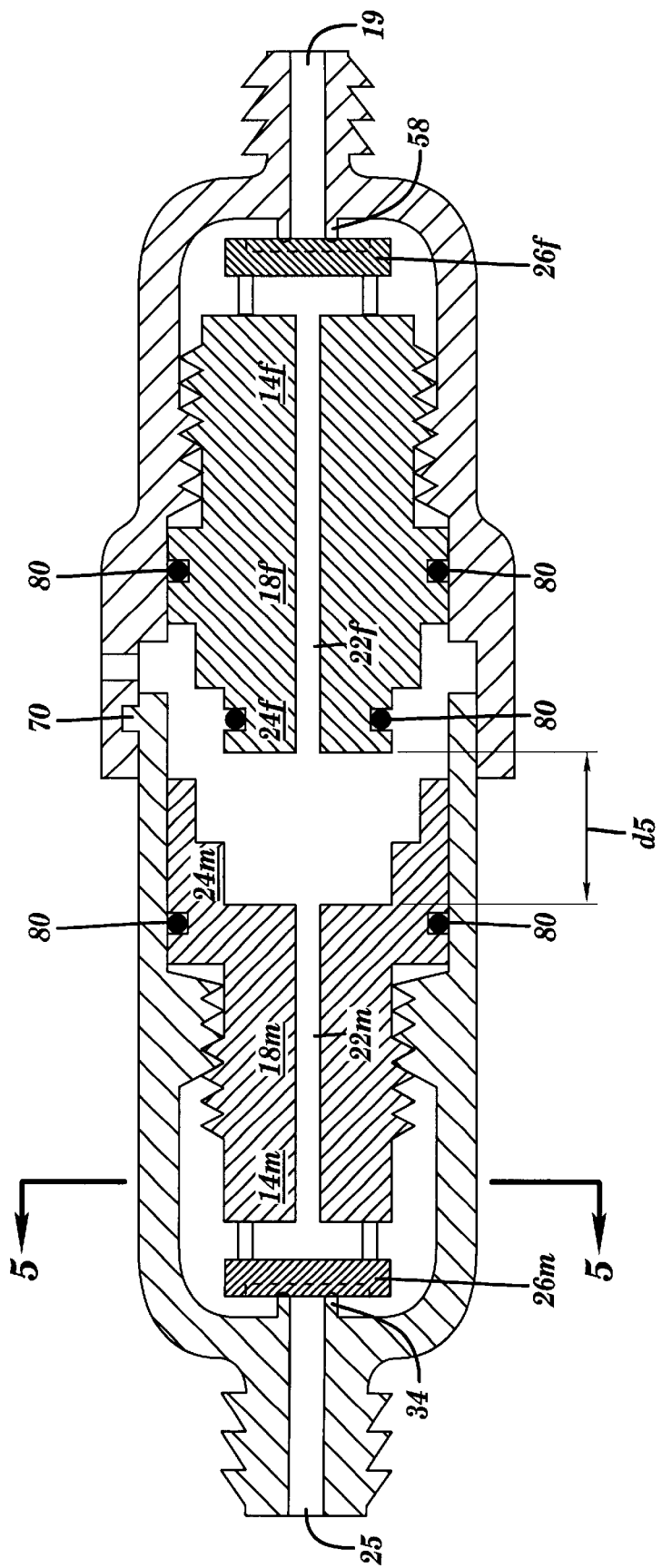
FIG. 3 illustrates an alternative embodiment of FIG. 2.

When the system 8 is in the closed position as shown in FIG. 3, the distances between (A)(i) the protrusion 34 and sealing apparatus 26m and (ii) the protrusion 58 and sealing apparatus 26f are minimal, and preferably, no distance at all, and (B) the male and female mating sections are a predetermined distance (d5) so the fluid passageways 22m, and 22f do not contact. These distances are obtained by rotating the fluid fitting assemblies 14m, 14f in a direction opposite to that disclosed above for putting the system 8 in the open position.

Figure 4:
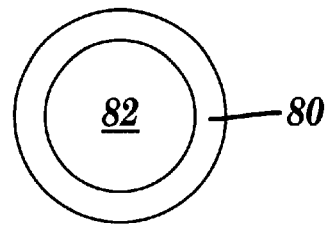
FIG. 4 illustrates a view of the sealing apparatus taken along the line 4—4 of FIG. 2.

As shown, the sealing apparatus 26m, 26m can be made of any conventional material that can seal the respective opening 28f, 28m, for example, a metal outer layer 80 with a rubberized interior area 82 as shown in FIG. 4, wherein the rubber area 82 contacts the protrusions 34, 58 in the closed position as shown in FIG. 3.

Figure 5:
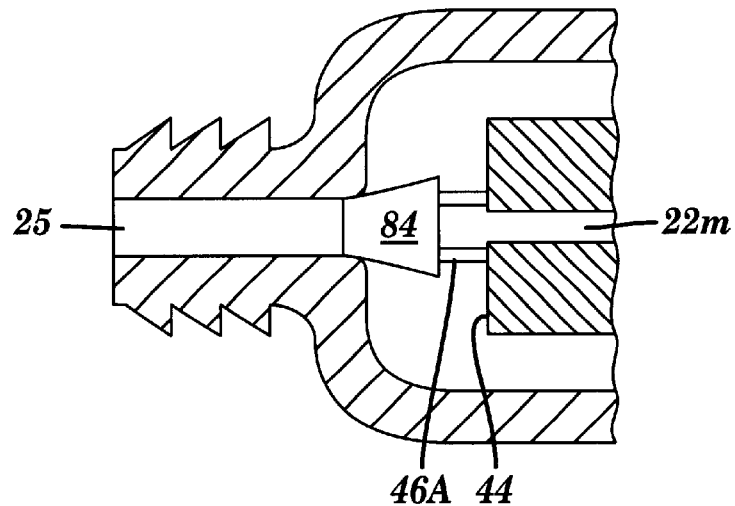
FIG. 5 illustrates an alternative embodiment of the present invention taken along the line 5—5 of FIG. 3.

FIGS. 5 and 6 illustrates an alternative embodiment of the sealing apparatus. Instead of being planar, and circular, as shown in FIG. 4, the sealing apparatus 84 could be shaped like a cork and be made of rubber or other resilient sealing material as shown in FIG. 5 or, as shown in FIG. 6, it can be an annual seal 90 on a protruding object 46 having a design in association with the seal 90 that seals the respective opening. Also, instead of plurality of extensions, the sealing apparatus 84 can be attached to the base section 44 by at least one planar extension 46A that does not completely block the passageway 22m. Moreover, the need for protrusions 34 are not necessary in this embodiment.

Although variations in the embodiment of the present invention may not each realize all the advantages of the invention, certain features may become more important than others in various applications of the device. The invention, accordingly, should be understood to be limited only by the scope of the appended claims.

We claim:

1. A fluid fitting coupling system comprising:
   a. a first fluid fitting assembly having a first fluid fitting body, a central axis, a first fluid passageway, a first mating component for rotation, and a first movable sealing apparatus at a proximal portion of the first fluid passageway in relation to the fluid fitting coupling system;
   b. a first rotationally engagable axial retainer having a first opening for a fluid to traverse there through, and to which the first fluid fitting is responsive;
   c. a second fluid fitting assembly having a second fluid fitting body, a central axis, a second fluid passageway, a second mating component for rotation that is engagable with the first mating component, and a second movable sealing apparatus at a distal portion of the second fluid passageway in relation to the fluid fitting coupling system;
   d. a second rotationally engagable axial retainer having a second opening for a fluid to traverse there through, to which said second fluid fitting assembly is responsive and which is capable of engaging said first rotationally engagable axial retainer;
   e. wherein when the second rotationally engagable axial retainer engages and rotates in a first direction the first rotationally engagable axial retainer, then the first and second mating components rotate the respective first and second fluid fitting in a direction opposite the first direction so the first movable sealing apparatus is spaced a distance from the first opening and the second movable sealing apparatus is spaced a distance from the second opening.

2. The fluid fitting coupling system of claim 1 further comprising:
   f. wherein when the second rotationally engagable axial retainer rotates, in a second direction, and disassociates from the first rotationally engagable axial retainer, the first and second mating components rotate the respective first and second fluid fitting in a direction opposite the second direction so the first movable sealing apparatus contacts the first opening and the second movable sealing apparatus contacts the second opening.

3. The fluid fitting coupling system of claim 1 wherein the first rotationally engagable axial retainer and the first fluid fitting assembly are connected by threads.

4. The fluid fitting coupling system of claim 1 wherein the second rotationally engagable axial retainer and the second fluid fitting assembly are connected by threads.

5. The fluid fitting coupling system of claim 1 wherein the first rotationally engagable axial retainer and the first fluid fitting assembly are connected by threads, and the threads.

6. The fluid fitting coupling system of claim 1 wherein the first movable sealing apparatus is a planar surface.

7. The fluid fitting coupling system of claim 1 wherein the first movable sealing apparatus is a plug shape.

8. The fluid fitting coupling system of claim 1 wherein the first mating component has a polygon shape.

9. A method of using a fluid fitting coupling system comprising
   a. a first fluid fitting assembly having a first fluid fitting body, a central axis, a first fluid passageway, a first mating component for rotation, and a first movable sealing apparatus at a proximal portion of the first fluid passageway in relation to the fluid fitting coupling system;
   b. a first rotationally engagable axial retainer having a first opening for a fluid to traverse there through, and to which the first fluid fitting is responsive;
   c. a second fluid fitting assembly having a second fluid fitting body, a central axis, a second fluid passageway, a second mating component for rotation that is engagable with the first mating component, and a second movable sealing apparatus at a distal portion of the second fluid passageway in relation to the fluid fitting coupling system;
   d. a second rotationally engagable axial retainer having a second opening for a fluid to traverse there through, to which said second fluid fitting assembly is responsive and which is capable of engaging said first rotationally engagable axial retainer;
   comprising the steps of:
      engaging the second rotationally engagable axial retainer with the first rotationally engagable axial retainer; and
      rotating in a first direction the second rotationally engagable axial retainer with the first rotationally engagable axial retainer which results in the first and second mating components rotating the respective first and second fluid fitting in a direction opposite the first direction so the first movable sealing apparatus is spaced a distance from the first opening and the second movable sealing apparatus is spaced a distance from the second opening.

10. The method of claim 9 further comprising the steps of:
    rotating in a second direction the second rotationally engagable axial retainer to disassociate the second rotationally engagable axial retainer from the first rotationally engagable axial retainer, which results in the first and second mating components rotating the respective first and second fluid fitting in a direction opposite the second direction so the first movable sealing apparatus contacts the first opening and the second movable sealing apparatus contacts the second opening.

11. The method of claim 9 wherein the first rotationally engagable axial retainer and the first fluid fitting assembly are connected by threads.

12. The method of claim 9 wherein the second rotationally engagable axial retainer and the second fluid fitting assembly are connected by threads.

13. The method of claim 9 wherein the first rotationally engagable axial retainer and the first fluid fitting assembly are connected by threads, and the threads.

14. The method of claim 9 wherein the first movable sealing apparatus is a planar surface.

15. The method of claim 9 wherein the first movable sealing apparatus is a plug shape.

* * * * *